United States Patent Office 3,316,255
Patented Apr. 25, 1967

3,316,255
PYRIMIDOPYRIMIDOTHIAZINE COMPOUNDS AND PRODUCTION THEREOF
Akira Takamizawa, Ibaraki-shi, and Yoshiro Sato, Takatsuki-shi, Japan, assignors to Shionogi & Co., Ltd., Osaka, Japan
No Drawing. Filed Feb. 23, 1965, Ser. No. 434,647
Claims priority, application Japan, Feb. 24, 1964, 39/9,962; June 8, 1964, 39/32,490; Sept. 12, 1964, 39/52,312, 39/52,315
4 Claims. (Cl. 260—243)

The present invention relates to pyrimidopyrimidothiazine compounds, and production thereof.

Particularly, the present invention relates to 1-(substituted or unsubstituted)phenyl-3-[2-(acylated or unacylated)hydroxyethyl]-4-methyl-9-alkyl-1,6 - dihydropyrimido[4′,5′-4,5]pyrimido[2,1 - C][1,4]thiazines (hereinafter referred to as "pyrimidopyrimidothiazine compound") represented by the formula:

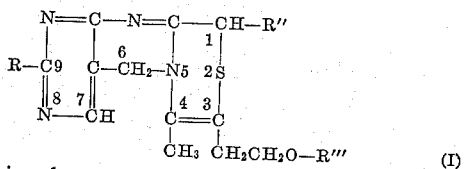

(I)

wherein R is a lower alkyl group, R″ is a substituted or unsubstituted phenyl group and R‴ is a hydrogen atom or an acyl group, and to their production.

It is a basic object of the present invention to embody pyrimidopyrimidothiazine compounds. Another object of this invention is to embody pyrimidopyrimidothiazine compounds useful as analgesic and abnormal fat metabolism controlling agents. A further object of the invention to embody a process for preparing pyrimidopyrimidothiazine compounds. These and other objects will be apparent to those conversant with the art to which the present invention pertains from the subsequent description.

The process of the present invention comprises treating a 3-(2-alkyl-4-aminopyrimidin-5-ylmethyl)-5-methyl-6[2-(acylated or unacylated)hydroxyethyl]-4-thiazolium compound hereinafter referred to as "thiazolium compound") represented by the formula:

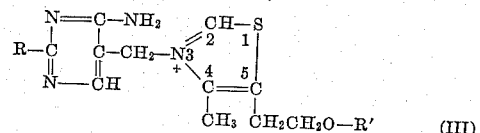

(III)

wherein R′ is a hydrogen atom or an acyl group, and R, R″ and R‴ have each the same significance as designated above with a substituted or unsubstituted benzoylphosphonic acid diester (hereinafter referred to as "reagent") represented by the formula:

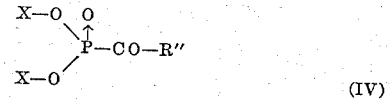

(IV)

wherein X is a lower alkyl group, an aryl group or an ar(lower)alkyl group and R″ has the same significance as designated above to give the said pyrimidoyrimidothiazine compound (I). In the connection, the acyl group represented by R′ and R‴ is intended to mean lower alkanoyl, benzoyl, benzoyl substituted with lower alkyl, lower alkoxy or halogen, and phenyl(lower)alkanoyl. Further, the substituent present in the substituted phenyl group represented by R″ may be lower alkyl, lower alkoxy or halogen.

The starting thiazolium compound (III) can be produced, for instance by treating the corresponding salt with a basic substance such as sodium hydroxide, potassium hydroxide, potassium carbonate, sodium carbonate, triethylamine, diethylamine, trimethylamine or ethylamine, if necessary, in an inert solvent such as benzene, toluene, xylene, dimethylformamide, dimethylsulfoxide or ether. Examples of the reagent (IV) are dimethyl benzoylphosphonate, diethyl benzoylphosphonate, diphenyl benzoylphosphonate, dibenzyl benzoylphosphonate, diethyl toluoylphosphonate, diphenyl toluoylphosphonate, dimethyl ethylbenzoylphosphonate, diethyl propylbenzoylphosphonate, diethyl chlorobenzoylphosphonate, diphenyl chlorobenzoylphosphonate, dibenzyl bromobenzoylphosphonate, dimethyl methoxybenzoylphosphonate, diethyl methoxybenzoylphosphonate, diethyl ethoxybenzoylphosphonate, etc.

The present process is carried out by treating the thiazolium compound (III) with the reagent (IV) in an inert solvent at a temperature from room temperature (10∼30° C.) to reflux temperature. As the inert solvent, there may be employed benzene, toluene, xylene, dimethylformamide, dimethylsulfoxide, ether or the like. In the present process, there is usually produced a mixture of the pyrimidopyrimidothiazine compound (I) and of the following compound (II):

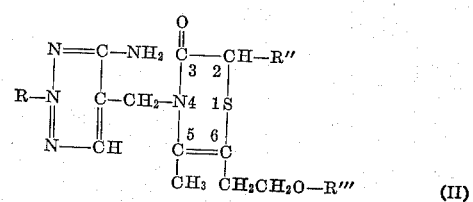

(II)

wherein R, R″ and R‴ have each the same significance as designated above. The yield ratio of these products is associated with the water present in the reaction medium. In general, the presence of less than about 0.5 molar amount of water to 1 molar amount of the thiazolium compound (III) is inclined to give the pyrimidopyrimidothiazine compound (I) as main product. The existence of a larger amount of water is not favorable, because it may cause the decomposition of the reagent (IV) and, therefore, result in the decreased yield of the product.

When the pyrimidopyrimidothiazine compound (I) is obtained as a main product, it may be, if necessary, hydrolyzed to the thiazine compound (II). The hydrolysis can be effected by a per se conventional procedure, e.g. treatment with an acid such as hydrochloric acid, sulfuric acid or acetic acid or a base such as potassium hydroxide, sodium hydroxide or sodium carbonate in an aqueous medium.

In the course of the above reactions, the hydroxyl group and the acyloxy group at the terminal position of the side chain may be acylated and hydrolyzed, respectively. These side reactions, however, do not afford any unfavorable effect on the proceeding of the main reactions.

The thus prepared pyrimidopyrimidothiazine compound (I) and the thiazine compound (II) are useful as analgesic agents. For instance, 1-phenyl-3-(2-benzoyloxyethyl)-4, 9-dimethyl-1,6 - dihydropyrimido[4′,5′ - 4,5]pyrimido[2, 1-C][1,4]thiazine (I:R=CH$_3$, R″=C$_6$H$_5$, R‴=C$_6$H$_5$CO)

and 2-phenyl-3-oxo-4-(2 - methyl - 4-aminopyrimidin-5-ylmethyl)-5-methyl-6-(2-hydroxyethyl)-2,3-dihydro - 4H-1,4-thiazine (II:R=CH$_3$, R″=C$_6$H$_5$, R‴=H) gave respectively the ED$_{50}$ value of 230 mg./kg. and 185 mg./kg. in the test using mice according to the modified Haffner method. They are also useful as abnormal fat metabolism controlling agents. For instance, in the vitro test using epididymal adipose tissue fragments of rats, 1 milligram of 2-phenyl-3-oxo-4-(2-methyl-4-aminopyrimidin-5-ylmethyl)-5-methyl - 6-(2-hydroxyethyl)-2,3-dihydro-4H-1,4-thiazine (II:R=CH₃, R″=C₆H₅, R‴=H) produced 50% block of the lipolytic activity with 1 microgram of ACTH.

As well known, the thiazolium compound (III) exists in a state of equilibrium with the corresponding thiol-type compound represented by the formula:

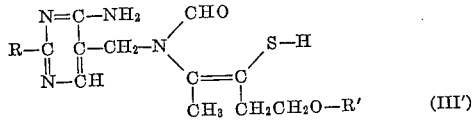

(III')

wherein R and R' have each the same significance as designated above. This thiol-type compound (III') can be also used as the starting material in the present process. However, the use of the thiol-type compound (III') is much inferior to that of the thiazolium compound (III) in the yield of the products. It is theoretically supposed that the thiol-type compound (III') is previously changed to the thiazolium compound (III) and then reacted with the reagent (IV).

Presently-preferred embodiments of the present invention are illustratively shown in the following examples.

*Example 1*

To a suspension of thiamine hydrochloride (33.7 g.) in water (17 ml.) cooled with ice, there is dropwise added a solution of sodium hydroxide (12.0 g.) in water (17 ml.) around 10° C. After the addition is completed, the resultant mixture is stirred for 30 minutes. Acetone (1000 ml.) is added thereto, and further stirring is continued for 30 minutes. The separated crystalline material is collected by filtration with suction, washed with acetone and dried over calcium chloride and then phosphorus pentoxide to give 3-(2-methyl-4-aminopyrimidin-5-ylmethyl)-4-methyl - 5 - (2-hydroxyethyl)-4 - thiazolium compound (sodium hydroxide adduct) (33.5 g.) as yellow powdery crystals.

The above obtained crystals (12.6 g.) are suspended in anhydrous toluene (60 ml.), and diethyl benzoylphosphonate (14.5 g.) is added at room temperature while stirring whereby the reaction proceeds with generation of heat. After 15 minutes, the temperature elevates up to 55° C. Further stirring is continued at room temperature for 4.5 hours and at 100° C. for 4 hours. N hydrochloric acid (60 ml.) is added to the reaction mixture while cooling with ice and shaken. The water layer is washed with ether and allowed to stand in a refrigerator. The precipitate is collected by filtration and crystallized from water to give 2-phenyl-3-oxo-4-(2-methyl-4-aminopyrimidin-5-ylmethyl)-5 - methyl-6-(2-benzoyloxyethyl)-2,3-dihydro-4H-1,4-thiazine hydrochloride (7.8 g.) as crystals melting at 146 to 148° C. (decomp.).

*Example 2*

Thiamine hydrochloride (involving water: 2.58%) (16.8 g.) is suspended in triethylamine (45.5 g.), and dimethylformamide (80 ml.) is added thereto. To the resultant mixture, there is added portionwise diethyl benzolyphosphonate (24.2 g.) at about 10° C., and the resulting mixture is heated at 110° C. for 7.5 hours. The reaction mixture is concentrated under reduced pressure and combined with a mixture of ether (60 ml.) and 2 N hydrochloric acid (80 ml.). The water layer is washed with ether and allowed to stand in a refrigerator. The precipitate is collected by filtration, dissolved in chloroform and filtered to separate the chloroform insoluble material. The filtrate is concentrated under reduced pressure and the residue crystallized from water to give 2-phenyl-3-oxo-4-(2-methyl-4-aminopyrimidin-5-ylmethyl)-5-methyl-6-(2-benzoyloxyethyl)-2,3-dihydro - 4H-1,4-thiazine hydrochloride (8.9 g.) as crystals melting at 146 to 148° C. (decomp.). The chloroform insoluble material is dissolved in water, neutralized with potassium carbonate and extracted with chloroform. The chloroform extract is concentrated under reduced pressure and the residue crystallized from ethanol to give 2-phenyl-3-oxo-4-(2-methyl-4-aminopyrimidin-5-ylmethyl)-5-methyl-6-(2-hydroxyethyl)-2,3-dihydro - 4H-1,4-thiazine (5.6 g.) as crystals melting at 106 to 107° C.

*Example 3*

To a suspension of S-sodium salt of thiol-type thiamine (210 g.) in anhydrous toluene (1000 ml.), there is added diethyl benzoylphosphonate (242 g.) while stirring, and the resultant mixture is allowed to stand overnight at room temperature and heated at 100° C. for 5 hours while stirring. The reaction mixture is shaken with 2 N hydrochloric acid (1000 ml.). The water layer is washed with ether whereby crystals are separated. The organic solvent layer is washed with hydrochloric acid and allowed to stand at room temperature whereby crystals are separated. The separated crystals are combined together and recrystallized from water to give 2-phenyl-3-oxo-4-(2-methyl-4-aminopyrimidin - 5 - ylmethyl)-5-methyl-6-(2-benzoyloxyethyl) - 2,3 - dihydro-4H-1,4-thiazine hydrochloride (56 g.) as crystals melting at 163 to 164° C.

*Example 4*

To a suspension of thiamine hydrochloride (involving water: 0.63%) (16.8 g.) in triethylamine (45.5 g.), there is added toluene (80 ml.), and diethyl benzoylphosphonate (24.2 g.) is dropwise added thereto at about 5° C. The resultant mixture is stirred until the generation of heat is finished and then heated at 110° C. for 8 hours. After cooling, 2 N hydrochloric acid (80 ml.) is added to the reaction mixture and shaken. The organic solvent layer is allowed to stand in a refrigerator. The separated crystals are collected by filtration and recrystallized from a mixture of methanol and ether to give 1-phenyl - 3 - (2-benzoyloxyethyl)-4,9-dimethyl-1,6-dihydropyrimido[4′,5′-4,5]pyrimido[2,1-C][1,4]thiazine (5.5 g.) as crystals melting at 196 to 198° C. The water layer is extracted with chloroform. The chloroform extract is dried over anhydrous magnesium sulfate and concentrated under reduced pressure. The resinous material is chromatographed on alumina, eluted with acetone and crystallized from acetone to give 1-phenyl-3-(2-hydroxyethyl) - 4,9-dimethyl-1,6-dihydropyrimido[4′,5′-4,5]pyrimido[2,1-C][1,4]thiazine (10.5 g.) as crystals melting at 201° C.

The above prepared 1-phenyl-3-(2-benzoyloxyethyl)-4,9-dimethyl - 1,6 - dihydropyrimido[4′,5′-4,5]pyrimido[2,1-C][1,4]thiazine (5.0 g.) is dissolved in 2 N hydrochloric acid (30 ml.) and allowed to stand in a refrigerator for 48 hours. The precipitate is collected by filtration and crystallized from water to give 2-phenyl-3-oxo-4-(2-methyl-4-aminopyrimidin-5-ylmethyl) - 5 - methyl-6-(2-benzoyloxyethyl)-2,3-dihydro-4H-1,4-thiazine hydrochloride (3.7 g.) as crystals melting at 146 to 148° C. (decomp.).

In the similar manner, there are produced the followings compounds: e.g. 2-phenyl-3-oxo-4-(2-methyl-4-aminopyrimidin-5-ylmethyl)-5-methyl - 6 - (2-acetyloxyethyl)-2,3-dihydro-4H-1,4-thiazine (M.P., 90 to 92° C.; crystallized from ether), 2-(4-tolyl)-3-oxo-4-(2-methyl-4-aminopyrimidin - 5 - ylmethyl)-5-methyl-6-(2-hydroxyethyl)-2,3-dihydro-4H-1,4-thiazine (M.P., 127 to 130° C.; crystallized from aqueous ethanol), 2-(4-tolyl)-3-oxo-4 - (2-methyl-4-aminopyrimidin-5-ylmethyl)-5-methyl-6-[2-(4-toluoyloxy)ethyl]-2,3-dihydro - 4H - 1,4 - thiazine (M.P., 135 to 140° C.; crystallized from ethanol), 2-(4-chlorophenyl)-3-oxo-4-(2-methyl - 4 - aminopyrimidin-5-ylmethyl) - 5 - methyl-6-[2-(4-chlorobenzoyloxy)ethyl]-2,3-dihydro-4H-1,4-thiazine (M.P., 103 to 106° C. (decomp.); crystallized from ethanol), 2-(2-methoxyphenyl) - 3 - oxo - 4 - (2-methyl-4-aminopyrimidin-5-ylmethyl) - 5 - methyl-6-(2-hydroxyethyl)-2,3-dihydro-4H-1,4-thiazine (M.P., 200 to 202° C.; crystallized from ethanol), etc.

What is claimed is:

1. A pyrimidopyrimidothiazine compound of the formula:

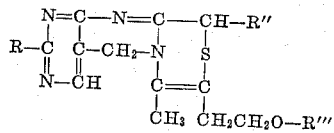

wherein R is lower alkyl, R'' is a member selected from the group consisting of phenyl, lower alkylphenyl, lower alkoxyphenyl and halogenophenyl, and R''' is a member selected from the group consisting of hydrogen, benzoyl, lower alkanoyl and lower alkylbenzoyl.

2. 1-phenyl - 3 - (2-benzoyloxyethyl)-4,9-dimethyl-1,6-dihydropyrimido[4',5'-4,5]pyrimido[2,1-C][1,4]thiazine.

3. 1-phenyl - 3 - (2 - hydroxyethyl)-4,9-dimethyl-1,6-dihydropyrimido[4',5'-4,5]pyrimido[2,1-C][1,4]thiazine.

4. A process for preparing a pyrimidopyrimidothiazine compound of the formula:

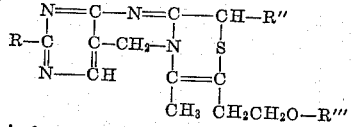

wherein R is lower alkyl, R'' is a member selected from the group consisting of phenyl, lower alkylphenyl, lower alkoxyphenyl and halogenophenyl, and R''' is a member selected from the group consisting of hydrogen, benzoyl, lower alkanoyl and lower alkylbenzoyl, which comprises treating a thiazolium compound of the formula:

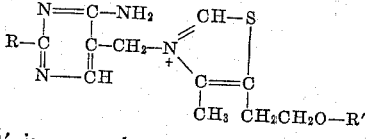

wherein R' is a member selected from the group consisting of hydrogen, benzoyl, lower alkyanoyl and lower alkylbenzoyl, and R has the same significance as designated above with a reagent of the formula:

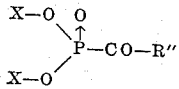

wherein X is a member selected from the group consisting of lower alkyl, aryl and ar(lower)alkyl and R'' has the same significance as designated above.

No references cited.

ALEX MAZEL, *Primary Examiner.*

RICHARD J. GALLAGHER, *Assistant Examiner.*